United States Patent
Beynon et al.

(10) Patent No.: US 6,836,881 B2
(45) Date of Patent: Dec. 28, 2004

(54) REMOTE TRACING OF DATA PROCESSING NODES IN AN ASYNCHRONOUS MESSAGING NETWORK

(75) Inventors: Stephen John Beynon, Bristol (GB); Brian Kenneth Mihell, Petersfield (GB); Andrew Mark Swinson, Eastleigh (GB); Geoffrey Martin Winn, Fair Oak (GB)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 09/817,832

(22) Filed: Mar. 26, 2001

(65) Prior Publication Data

US 2002/0049801 A1 Apr. 25, 2002

(30) Foreign Application Priority Data

May 19, 2000 (GB) .............................................. 0011978

(51) Int. Cl.[7] .............................................. G06F 9/44
(52) U.S. Cl. ...................................... 717/128; 710/260
(58) Field of Search ................................. 717/128, 127, 717/125, 135; 710/260; 719/310, 313; 709/310, 242, 223, 224; 455/436

(56) References Cited

U.S. PATENT DOCUMENTS

| 5,630,049 | A | | 5/1997 | Cardoza ................. 395/183.01 |
| 6,145,121 | A | * | 11/2000 | Levy et al. .................. 717/135 |
| 6,202,199 | B1 | * | 3/2001 | Wygodny et al. ........... 717/125 |
| 6,243,834 | B1 | * | 6/2001 | Garrett ........................ 714/37 |
| 6,282,701 | B1 | * | 8/2001 | Wygodny et al. ........... 717/125 |
| 6,385,450 | B1 | * | 5/2002 | Watanabe .................... 455/436 |
| 6,578,087 | B1 | * | 6/2003 | Garakani et al. ........... 709/242 |

* cited by examiner

Primary Examiner—St. John Courtenay, III
Assistant Examiner—Van Nguyen
(74) Attorney, Agent, or Firm—Synnestvedt & Lechner LLP; Jerry W. Herndon

(57) ABSTRACT

Remote tracing from a local data processing node of the execution of a process within an application program running on a remote data processing node in a distributed data processing network. The application program includes its own local trace facility and the nodes communicate by asynchronous messaging via mailboxes. Each node includes process-provate interrupt handling means for indicating the presence of a command for the respective process in the mailboxes.

23 Claims, 7 Drawing Sheets

REMOTE TRACING OF DATA PROCESSING NODES IN AN ASYNCHRONOUS MESSAGING NETWORK

FIELD OF THE INVENTION

The present invention relates to the remote tracing of a plurality of data processing nodes, which are connected to each other via a network.

BACKGROUND OF THE INVENTION

As computer systems increase in size and complexity, it has become common to distribute data processing applications over a plurality of data processing nodes, communicating over a data communications network, for example, the Internet. This allows a large data processing task to be distributed over several data processing nodes whilst also allowing exchange of data messages, which can consist of requests for processing or replies containing the results of processing. The data processing nodes can be arranged so that a local data processing node can control a remote data processing node. However, it is difficult to monitor operation of remote nodes to facilitate error detection and correction.

Tracing operations are known in the prior art for the purpose of tracing the path of execution of an application to assist in locating errors therein. The tracing operation assists in problem determination by providing a snapshot record in storage of certain types of states existing when a location in an application is reached by the data processing node that is running the application. Such events or states are often stored in a trace table or in trace files in memory.

Static or local tracing operations in response to commands issued within a node is known in the prior art. However, these commands cannot be used to initiate remote traces or dynamic alteration of commands at runtime. Extending tracing operations to remote nodes may involve large overheads and is often intrusive. It is difficult to achieve an acceptable trade off between response times and existing hardware, as the link between data processing nodes may be slow, limiting the efficiency of data exchange. Additionally, if the results from the remote operations are written into a file for subsequent perusal or if the remote data processing node only periodically reports to the local data processing node, this will further delay response times.

Tracing operations are often implemented prior to debugging operations in order to isolate a problem area. Debuggers are tightly coupled to the processes which are targeted and are therefore effective in dealing in detail with the problem identified by the tracing operation. Debugging generally involves stepping a program one step at a time, through all possible paths of execution and monitoring its behaviour. This differs from monitoring the normal execution of the program in a production mode, when execution events are traced in real-time.

Remote debugging to facilitate problem determination and replication of real-time conditions on remote systems is known, for example, as described in U.S. Pat. No. 5,630, 049. Although avoiding problems of prior remote debuggers arising from the fact that the data processing nodes typically must be in close physical proximity to each other, which limits the flexibility of the testing environment, the debugging process carries a large overhead and is relatively intrusive in comparison with a trace process. Problems with data processing nodes on a customer site often occur in unpredictable circumstances and the fine control and detailed activity of a debugger is not required for first pass problem analysis.

U.S. Pat. No. 5,630,049 also employs a method of asynchronous messaging in which messages between nodes of a network may be transmitted using process-private interrupts known as Asynchronous System Traps (ASTs). ASTs enable a faster and more reliable communication than with general asynchronous messaging.

SUMMARY OF THE INVENTION

However, there is still a need for a remotely controlled tracing operation in a network of data processing nodes, which executes with minimum intrusion into the data processing nodes. There is also a need for the remote tracing operation to respond dynamically in an acceptable time frame and without limiting the physical proximity of nodes from each other.

Accordingly, the present invention provides a method for remote tracing from a local data processing node of the execution of a process within an application program running on a remote data processing node in a distributed data processing network, said application program including its own local trace facility, said nodes communicating by asynchronous messaging via a data exchange means and each node including process-private interrupt handling means for indicating the presence of a command for the respective process in said data exchange means, said method comprising the steps of sending a trace command from a trace process running on said local data processing node into a data exchange means of said remote data processing node; in response to said trace command, causing a process-private interrupt of a target process running on said remote data processing node; in response to said process-private interrupt, said target process writing trace information from said trace facility to said data exchange means; transmitting said trace information across said network; receiving in a data exchange means on said local data processing node, said transmitted trace information; in response to receiving said trace information, causing a process-private interrupt of said trace process; and in response to said process-private interrupt, reading said trace information by said trace process, from said local data exchange means.

Specifically, the tracing operation is advantageous as it can be executed with networked data processing nodes. This allows an end user on a local data processing node to dynamically perform tracing and diagnostic operations of remote data processing nodes. For example, a service provider can perform online diagnostics of data processing nodes located on a customer site, assuming a secure architecture.

In a further preferred aspect of the present invention, there is provided a distributed data processing system comprising a plurality of data processing nodes connected via a network, each node having a processor, memory and operating system capable of executing application programs, each of said operating systems including data exchange means and interrupt handling means, a first of said nodes comprising means for sending a trace command from a trace process running on said first data processing node into the data exchange means of a second data processing node, said second data processing node including a trace facility for tracing the execution of a process within an application program running on said second node, said interrupt handling means of said second data processing node in response to said trace command, causing a process-private interrupt of a target process running on said second data processing node; said second data processing node further including means for writing trace information from the trace facility, to said second data exchange means in response to the process-private interrupt; and means for transmitting said trace information across said network whereby said first data exchange means receives said transmitted trace information at said first data processing node; and in response to receipt of said trace information, said first interrupt handling means causes a process-private interrupt of said trace process; said first data processing node further including means for reading said trace information, from said first data exchange means in response to said process-private interrupt.

In other aspects, the present invention provides a computer program for remote tracing of data processing nodes in an asynchronous messaging network In a further preferred aspect of the present invention, there is provided a method in which the step of sending a trace command further comprises the following steps. Firstly, a trace command is written from a trace process into the local data exchange means. In response to the trace command, the process private interrupt on the local data processing node is initiated. Next, the trace command is transmitted across the network and then the process-private interrupt is replicated on the remote data processing node, in response to the transmitted trace command. An end user can dynamically issue trace commands in order to alter the processes to be traced and the nature of the trace information returned. Therefore, the user has real-time control over the remote tracing operations. This has considerable advantages over the static tracing operations mentioned in the prior art, since diagnostic information from remote data processing nodes can be viewed "on-the-fly".

According to a preferred embodiment of the present invention, once a process private interrupt has been caused of the target process, the process private interrupt is re-enabled. Preferably once the target process has written trace information into the remote data exchange means, the target process is re-started from the beginning of its execution.

According to a preferred embodiment of the present invention, the remote and local data exchange means are mailboxes. Furthermore separate mailboxes for read and write operations respectively, can be implemented. Each pair of read/write mailboxes are connected and in a system with fewer components, this is advantageous because the input/output operations can be easily differentiated Preferably, the trace information is encrypted on the remote data processing node prior to transmission, and is decrypted on the local data processing node upon receipt of the trace information. This is advantageous in a customer environment, since the trace information transmitted is secure. Preferably, the trace information is annotated so that it is concise and the amount of information transmitted across the communications medium is limited, ensuring that there is efficient data exchange between the data processing nodes.

In a further preferred aspect of the present invention the network is the Internet, however there is no limitation on the type of communications medium between the remote and local data processing nodes. For example, SNA could just as well be used. However, using TCP/IP, which is the main Internet protocol, is beneficial since this is the most widespread method for connecting disparate data processing nodes together. Additionally, executing the remote tracing operation over large distances where the data processing nodes are not in close proximity to each other is trivial.

In other preferred aspects of the present invention, the trace information transmitted across the communications medium can be viewed with a monitor connected to the data processing nodes.

Thus the present invention can be used as a diagnostic tool in conjunction with debugging operations. Since remote tracing operations are less tightly coupled to the processes to be traced compared with debugging operations, the results from the tracing can be used as an indicator as to where a problem lies. Subsequent to remote tracing operations, debugging operations can be executed to analyse the isolated problem in more depth.

BRIEF DESCRIPTION OF THE DRAWINGS

The present invention will now be described, by way of example only, with reference to preferred embodiments thereof as illustrated in the following drawings.

DETAILED DESCRIPTION OF THE PREFERRED EMBODIMENT

Figure 1:
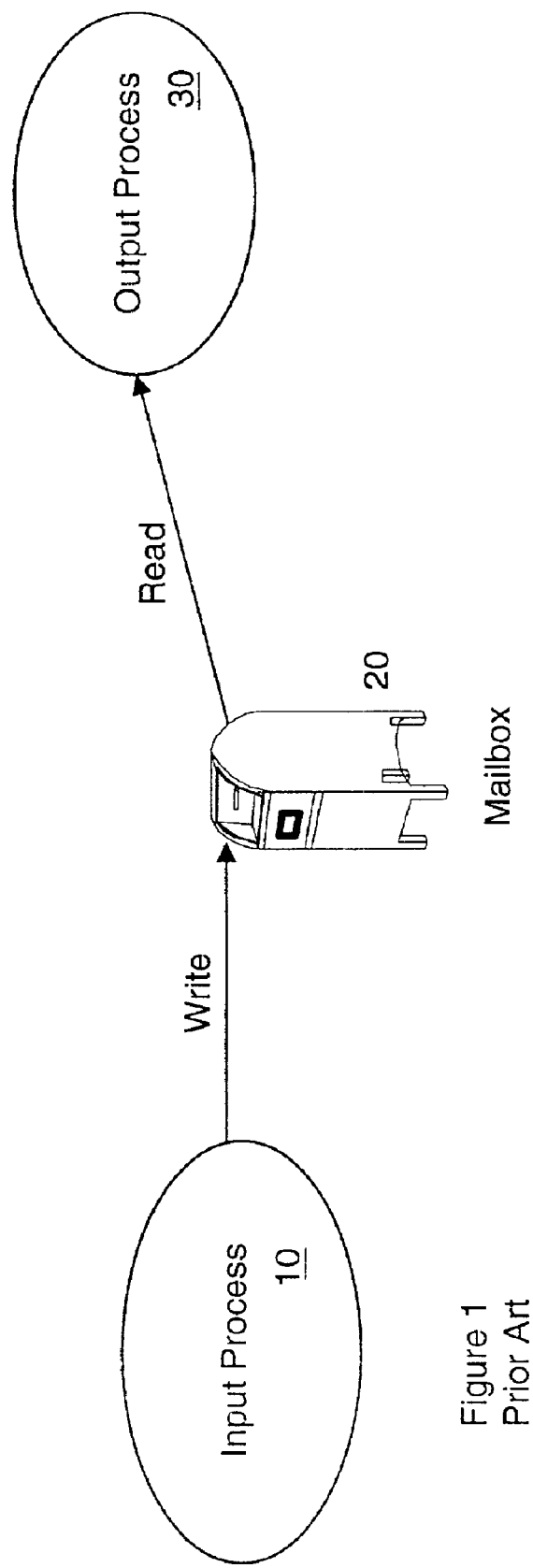
FIG. 1 shows a schematic diagram of a prior art system of inter-process communication within a single data processing node.

FIG. 1 illustrates schematically a known method of inter-process communication within a single data processing node. A single data processing node, as described herein, consists of a server or a client workstation.

The mailbox (20) is a software feature of the OpenVMS operating system and is used to exchange data between processes. (OpenVMS is a trademark of Compaq Computer Corporation.) The mailbox (20) is a pseudo device, which can be read and written, thus functioning as a buffer. A process (30) issues an I/O request to a mailbox (20) by declaring that a named procedure within the process (30) is to be run when information is written into the mailbox (20).

In the OpenVMS operating system, the named procedure is a process-private interrupt, known as an asynchronous system trap (AST). The AST is a software interrupt occurring during the execution of machine instructions in a process, allowing the instructions to be resumed from the beginning of execution. The initiation of the AST is caused by a process which is to receive notification during an I/O request.

To enable the AST to provide notification to the process (30) that information has been inputted into the mailbox (20), the process (30) includes a function modifier in the I/O request, known as the write attention (WRTATTN) function modifier.

Therefore, when the input process (10) writes information into the mailbox (20), this causes the mailbox (20) to deliver the attention WRATTN AST by queuing it to the process (30) that initiated the original I/O request. This technique allows the process (30) to continue executing and performing other tasks, without it having to poll the mailbox (20) or otherwise stall. Hence, an I/O request is not outstanding at all times.

The notification from the AST results in the process (30) initiating an AST with the function modifier READATTN. The READATTN AST prompts the process (30) to read the information from the mailbox (20), therefore completing the I/O request. It is possible for multiple processes to request an AST for the same mailbox. Therefore, the first process to issue a request will complete the transfer of information.

Figure 2:
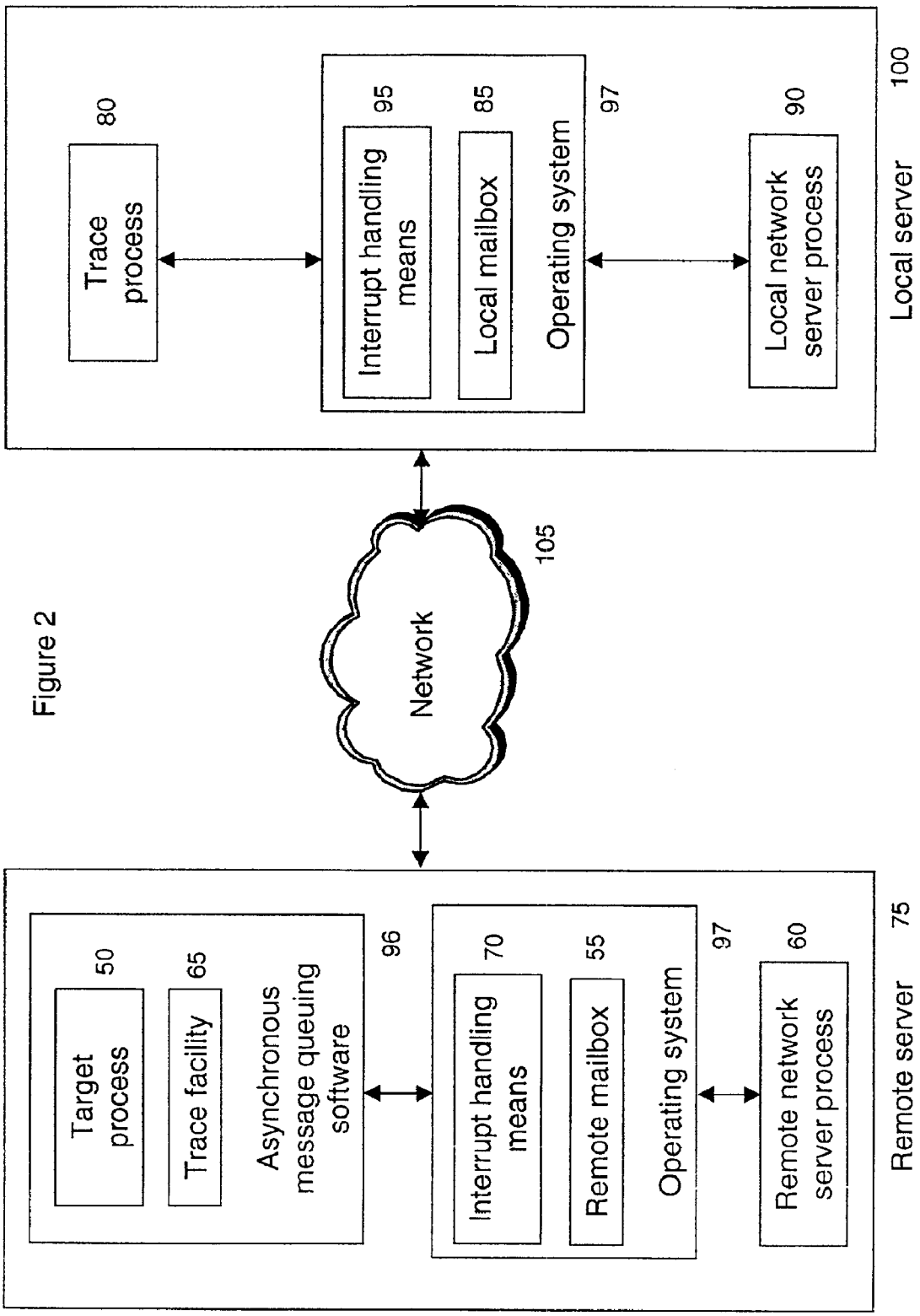
FIG. 2 is a block diagram of communicating network servers in which the present invention may be implemented.

For a more complete understanding of the present invention, attention is directed to FIG. 2, in which the principal data structures and functional components of a computer system in which the invention is implemented are shown. FIG. 2 illustrates two servers (75, 100) in communication with each other via a network (105). In a preferred embodiment of the present invention, the data processing nodes including the servers (75, 100) utilise the OpenVMS operating system (97). Preferably, the network (105) is the Internet.

In normal operation, the server (75) of a remote data processing node executes a process (50), which is the target for the remote tracing operation. In this example, the process (50) is executing as part of the asynchronous message queuing product (96) MQSeries, which is installed on the remote server (75). (MQSeries is a trademark of IBM corporation.) The MQSeries client program can also be installed on client workstations connected to the remote server (75). With the MQSeries product, there are different types of processes running, sometimes existing in multiple copies. Any of these processes are eligible as a target for the remote tracing operation.

A remote network server process (60) communicates with the target process (50) utilising a data exchange means (55) and an interrupt handling means (70), which are features of the operating system (97). Also located on the remote server (75), is an existing local trace facility (65), which can be used within the single data processing node (75) to execute static trace commands.

A trace process (80), which initiates the remote tracing operation, is executing on a local server (100). A local network server process (90) communicates with the trace process (80) utilising a data exchange means (85) and an interrupt handling means (95). The local network server process (90) and the remote network server process (60) communicate with each other using the network (105).

Although the present invention has been applied to asynchronous message queuing software (96), it should be understood that the present invention could be applied to any other type of process or software program.

Figure 3:
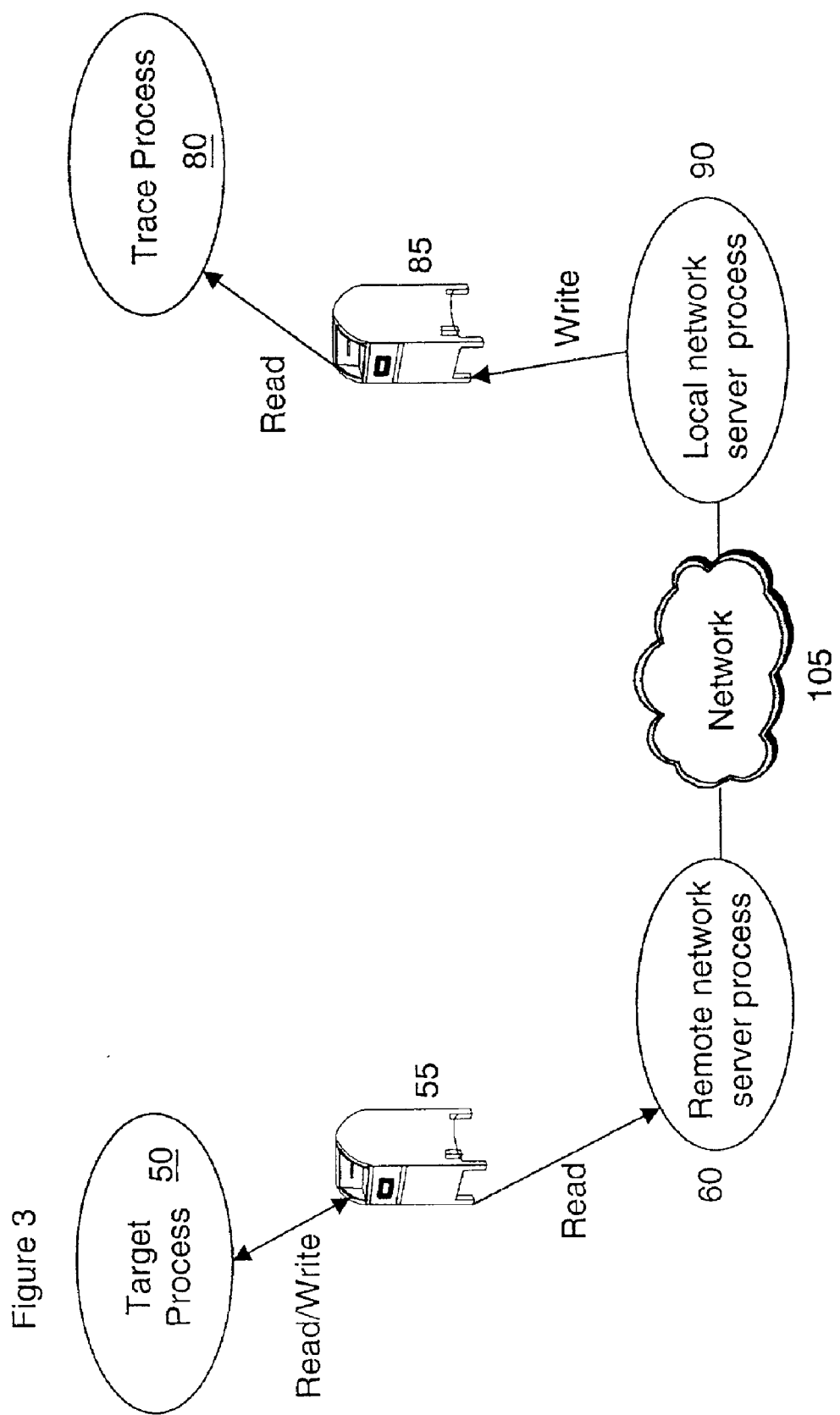
FIG. 3 shows a schematic diagram of a distributed data processing system for tracing operations in remote data processing nodes according to the present invention.

FIG. 3 illustrates schematically a tracing operation between remote data processing nodes. FIG. 3 is used in conjunction with FIG. 5, to provide a detailed description of the operations of FIG. 2. Mailbox (55) is located on the remote server (75) and mailbox (85) is located on the local server (100). Every process, be it target process (50) or trace process (80), has a mailbox of its own. For example, during a one way I/O request, a trace process will input trace commands into the mailbox of the target process. It will complete the I/O request by reading the resulting output from its own mailbox.

As shown in FIG. 2, the remote network server process (60) and the local network server process (90) communicate via the network (105). According to the preferred embodiment of the present invention, TCP/IP is utilised as the communications medium. Alternatively DECnet for Open-VMS or SNA could also be used. (DECnet is a trademark of Compaq Computer Corporation.)

Figure 5:
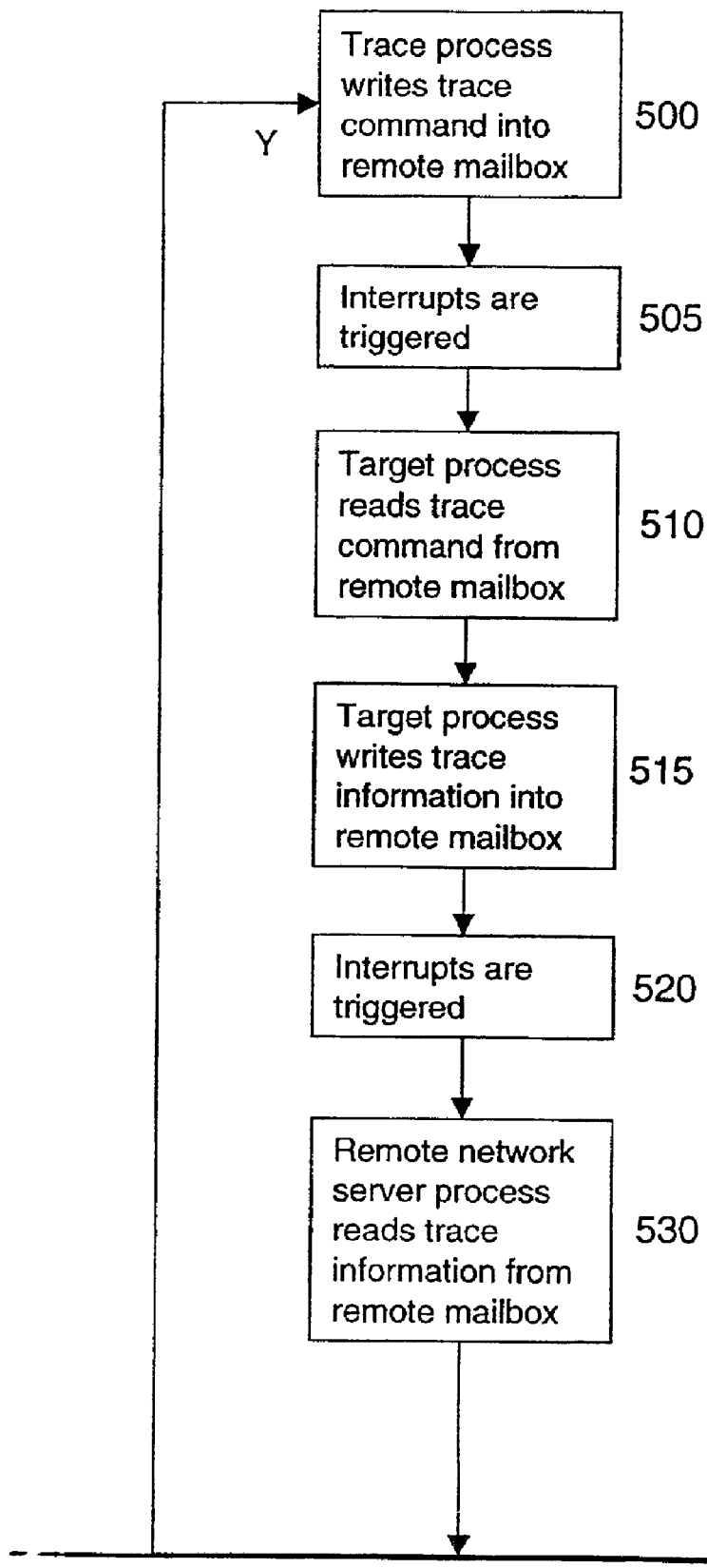
FIG. 5 is a flow chart showing the steps of a method for remote tracing of operations in remote data processing nodes, according to the present invention, in the systems of FIGS. 3 and 4.
Figure 5:
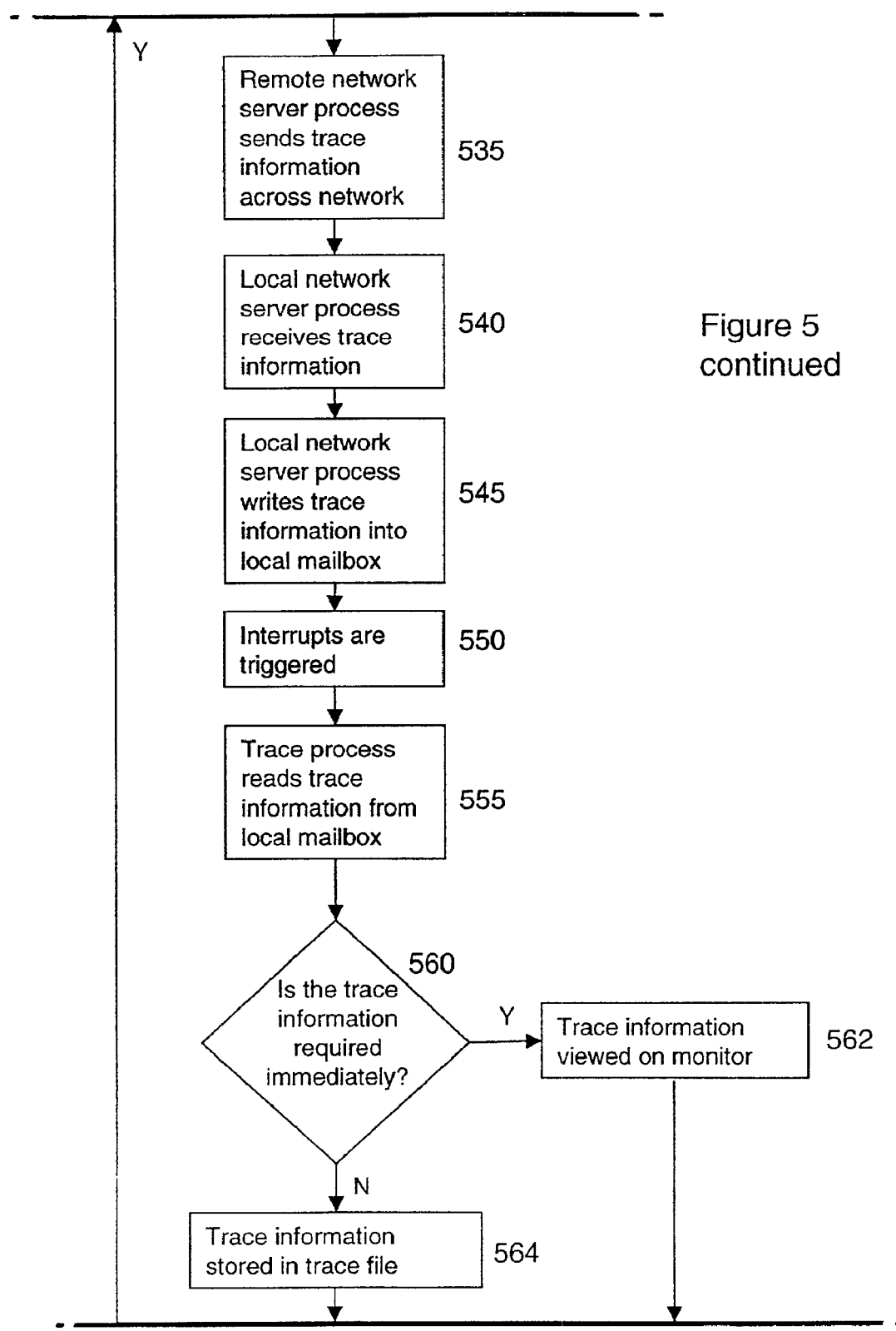
Figure 5:
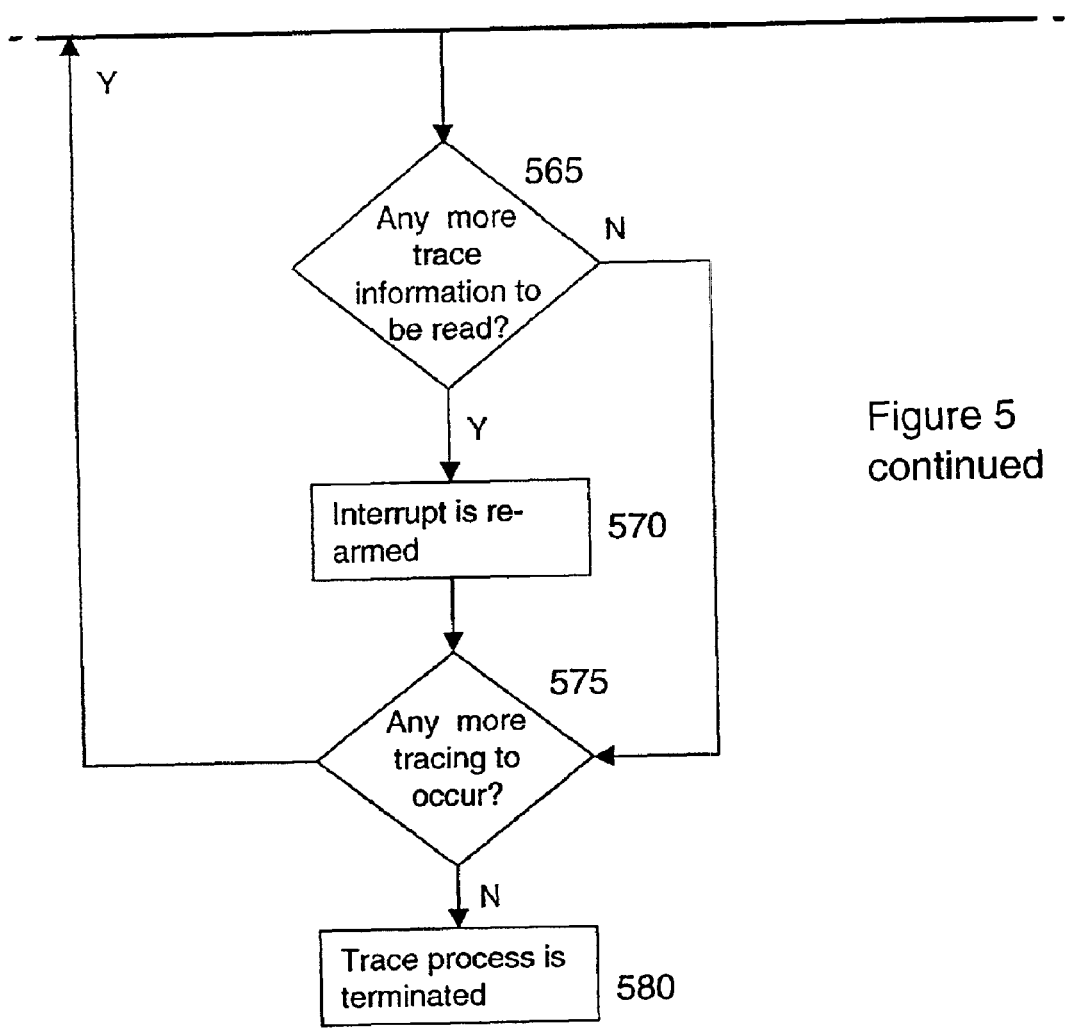

Referring to FIG. 5 illustrated in flow diagram form is the tracing operation between remote data processing nodes. The trace process (80) creates a mailbox (55) temporarily on the remote data processing node and the present invention enables the process (80) to write (500) a trace command into the mailbox (55) via the network (105). The target process (50) can distinguish between trace processes (80) and general processes, since the trace (80) and general processes utilise separate mailboxes. However, the use of separate mailboxes may cause a processing overhead, hence, alternatively, the trace processes (80) may be tagged with an identifier.

Trace commands typically report on function exit and entry points encountered during execution of the process being traced. It is possible to specify the range of functions being reported. Specifically, the target process (50) collects a certain amount of trace material automatically.

Specifically, an example of the use of trace commands in MQSeries is described. For instance, a record is kept on a stack of all the function calls that are currently active.

E.g. f called g called h

Therefore, h is currently executing. A trace program called monmq has a "show stack" command. The following trace commands are typed:
MQT>connect pid=0x132
MQT>show stack
MQT>disconnect pid=0x132

The first command establishes a connection to the process with id number 132 (hex). The second command uses trace mechanisms to obtain a snapshot of the current function call stack. The third command disconnects the process with id number 132 (hex).

Preferably, the trace process (80) can dynamically select any subset of the target processes to monitor, by sending further trace commands to the mailboxes associated with the selected subset and not to any other mailbox. The trace commands can also be dynamically varied to specify the nature of the trace material returned.

Once the trace command is written (500) into the mailbox (55), it is copied to a message block in a nonpaged pool, where it is stored until it is read. Since information in the form of a trace command has been written (500), an AST with the function modifier WRTATTN, is queued (505) to the target process (50), providing notification of the information.

The notification prompts the target process (50) to issue (505) a READATTN AST. This enables the process (50) to read (510) the trace command from the mailbox (55) and execute it. The present invention allows the target process (50) to respond to the command and enables the target process (50) to collect information regarding its own activity. The process (50) then writes (515) the trace information of its activity into the mailbox (55) of the remote data processing node. Preferably, the trace information is encrypted for added security.

In the present invention, step 515 initiates the trigger (520) of the interrupt, WRTATTN AST, notifying a process (60) running on the remote server that information is available in the mailbox (55). By issuing (520) a READATTN AST, the remote network server process (60) reads (530) the trace information from the mailbox (55). The remote network server process (60) then communicates with the local network server process (90) over the network (105), transmitting (535) the trace information to the local network server process (90).

The code in the trace information is preferably annotated so that it is concise and consists of for example, a few dozen bytes. The annotation limits the amount of information being transmitted and therefore improves the performance of the remote tracing operation. Additionally the efficiency of the remote tracing operation can also be improved by running the operation out of office hours and when the network bandwidth is satisfactory. Thus modest demands are made of the round trip time and the network. Utilising these measures will ensure that the results from the remote tracing operation will be received in an acceptable time frame and also that the operation does not have a substantial overhead associated with it.

The present invention allows the local network server process (90) to receive (540) the trace information, which it preferably decrypts. The local network server process (90) writes (545) the trace information into the mailbox (85) of the local data processing node. The events occurring on the remote data processing node have now been replicated on the local data processing node. This replication process differs from prior art such as Lotus Notes where long-term copies are made and with other techniques such as disk mirroring. The remote tracing operation is more efficient, since no lasting records are held. The replication of the environment, in that trace information has been written (545) into the local mailbox (85), causes the WRTATTN AST to be queued (550) to the trace process (80). In the present invention, the subsequent trigger (550) of a READATTN AST by the trace process (80) prompts the process (80) to read (555) the trace information from the mailbox (85).

Next, the end user decides (560) on the format of the output of the trace information. The trace information is either viewed (562) with a monitor of the local data processing node if the end user requires immediate results, or it is written (564) into a trace file for consequent perusal.

Next, the remote network server process (60) re-arms (570) the AST interrupt, if the operating system call made by the remote network server process (60) in order to read trace information from the mailbox (55) is to be repeated. The re-enabling of the ASTs is required since all the data is removed after each delivery of the AST.

If no further trace information is to be read, the end user decides (575) whether the tracing operation is to continue. If further tracing is required, the tracing operation is repeated when the trace process (80) writes (500) trace commands into the mailbox (55). If no further tracing is required, the trace process (80) is terminated (580). The termination occurs when an end user completes issuing further trace commands from the local data processing node. Alternatively the termination process could be automated and this is beneficial if for example, the tracing operation is to be completed after a certain period of time, or if the operation is to be executed during off-peak hours.

Figure 4:
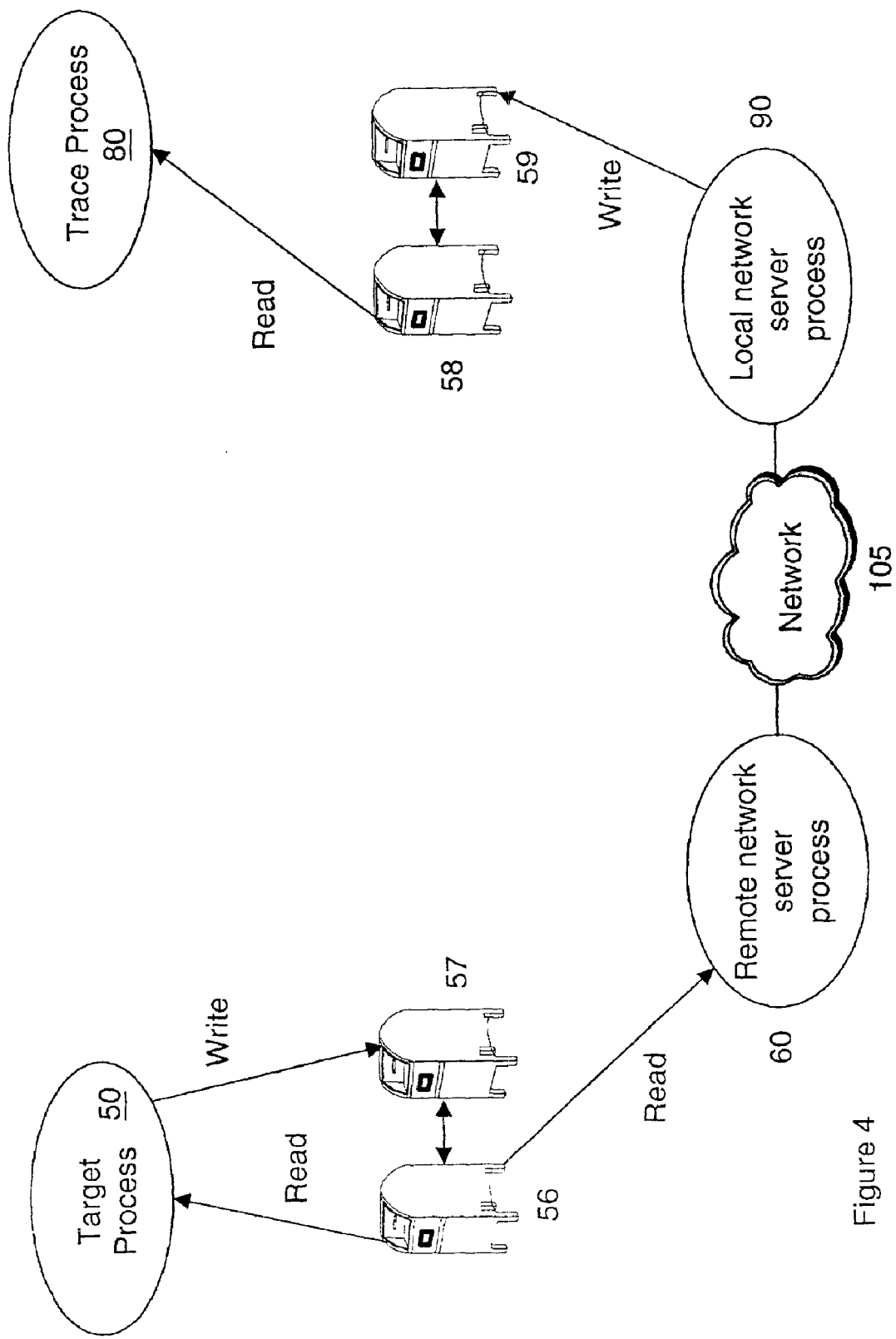
FIG. 4 shows a schematic diagram of a distributed data processing system for tracing operations in remote data processing nodes according to an alternative embodiment of the present invention.

FIG. 4 shows an alternative embodiment of the system as illustrated in FIG. 3. Shown are separate mailboxes for input and output operations, namely, write and read operations, respectively. Specifically, the input (57, 59) and output (56, 58) mailboxes are connected in order to exchange data between them.

Implementing separate mailboxes is simpler than implementing a shared mailbox, since input and output operations are easily differentiated. However, prompting a process to read from one mailbox and write into a separate mailbox may become complicated especially as the number of processes increases. Moreover, a higher overhead is associated with implementing multiple mailboxes. The implementation of a single mailbox for all input and output operations is more complex as the operations need to be distinguished. However, it is easier to use since all operations can occur via only one mailbox.

In a further preferred embodiment of the present invention, the remote tracing operation can also be applied to unresponsive or "hung" target processes. An unresponsive process may have terminated abnormally resulting in the suspension of any tasks the process was responsible for. Since the process is unresponsive to any input, determination of the cause of termination is not possible. One solution is to reboot the data processing node, although this may result in data loss.

Specifically, it is an OpenVMS feature for an interrupt to execute at a higher priority level than a process. Therefore, even though a process may be unresponsive, an interrupt can continue to execute, sending trace information detailing the possible cause of abnormal termination to the local data processing node. In this way, some degree of remote enquiry into the state of unresponsive, stalled target processes can be made.

Beneficially, by using a process-private interrupt, the trace process (80) can continue executing, since the interrupt will automatically execute once information is available in the mailbox (85). Therefore, the trace process (80) does not have to poll the mailbox (85) or otherwise stall. Alternatively, if the trace process (80) issues a simple read request from the mailbox (85), it will have to wait until the target process (50) has completed the write operation into the mailbox (85) before it can complete the I/O request. Therefore, the trace process (80) cannot perform any additional processing until the I/O request is completed.

By utilising asynchronous ASTs this problem is overcome. For example, on the local data processing unit, the end user may be involved in other tasks, such as, browsing through previous trace material. The end user can continue browsing without interruption, until information is written into the mailbox. Also, more importantly, in a customer environment, the intrusion into the executing processes on the remote data processing node is minimised, since the processes targeted can continue to do useful work until trace commands are written into the mailbox.

The dynamic control over the tracing operation and the limited amount of data being transmitted across a network ensures the operation is flexible and also improves the response times. Additionally, the present invention can be integrated into existing solutions easily, since standard features of an operating system, such as, data exchange means and interrupt handling means are utilised. Furthermore, the preferred communications medium, TCP/IP, is a common protocol for connecting distributed systems. This further facilitates integration into existing systems.

Generally, the advantages of remote tracing, namely the ability to perform diagnosis of networked data processing nodes, coupled with the benefits of implementing mailboxes and process-private interrupts, provides a less intrusive method of problem determination over a network, whilst also improving the performance times.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

We claim:

1. In a distributed data processing system comprising a plurality of data processing nodes connected via a network, each node having a processor, memory and operating system capable of executing application programs, each of said operating systems including data exchange means, said nodes communicating by asynchrouous messaging via respective data exchange means and each node including process-private interrupt handling means for indicating the presence of a command for a respective process in said data exchange means, a method for remote tracing from a local one of said data processing nodes of the execution of a process within an application program running on a remote one of said data processing nodes, said application program including its own local trace facility, said method comprising the steps of:

sending, via asynchronous messaging, a trace command from a trace process running on said local data processing node into a data exchange means of said remote data processing node;

in response to said trace command, causing a process-private interrupt of a target process running on said remote data processing node;

in response to said process-private interrupt, said target process writing trace information from said local trace facility to said data exchange means of said remote data processing node;

transmitting said trace information across said network;

receiving in a data exchange means on said local data processing node, said trace information;

in response to receiving said trace information, causing a process-private interrupt of said trace process; and in response to said process-private interrupt, reading said trace information by said trace process, from said local data exchange means.

2. A method as claimed in claim 1, in which the step of sending a trace command further comprises the steps of:

writing a trace command from a trace process into said local data exchange means;

initiating said process private interrupt on said local data processing node in response to said trace command;

transmitting said trace command across said network; and replicating said process-private interrupt on said remote data processing node in response to said trace command.

3. A method as claimed in claim 1, in which after the step of causing a process private interrupt of a target process, said process private interrupt is re-enabled.

4. A method as claimed in claim 1, in which after said step of said target process writing trace information, said target process is re-started from the beginning of its execution.

5. A method as claimed in claim 1, in which said remote data exchange means and said local data exchange means are mailboxes.

6. A method as claimed in claim 5 in which each of said remote data exchange means and local data exchange means comprise separate mailboxes for said reading and writing trace information operations, respectively.

7. A method as claimed in claim 1, in which said trace information is encrypted on said remote data processing node.

8. A method as claimed in claim 7, in which said trace information is decrypted on said local data processing node.

9. A method as claimed in claim 1, in which said trace information is annotated.

10. A method as claimed in claim 1, in which said network is the Internet.

11. A method as claimed in claim 1 in which said trace information is viewed with a monitor of said data processing nodes.

12. A computer program product stored on a computer readable storage medium for, when executed on a computer, instructing the computer to carry out the method of claim 1.

13. A distributed data processing system comprising a plurality of data processing nodes connected via a network, each node having a processor, memory and operating system capable of executing application programs, each of said operating systems including data exchange means and interrupt handling means, a first data processing node comprising:

asynchronous messaging means for sending a trace command from a trace process running on said first data processing node into a data exchange means of a second data processing node, said second data processing node including a local trace facility for tracing execution of a process within an application program running on said second data processing node, interrupt handling means of said second data processing node, in response to said trace command, causing a process-private interrupt of a target process running on said second data processing node;

said second data processing node further including means for writing trace information from the local trace facility, to said data exchange means of said second data processing node in response to the process-private interrupt; and means for transmitting said trace information across said network whereby a data exchange means of said first data processing node receives said trace information at said first data processing node; and in response to receipt of said trace information, interrupt handling means of said first data processing node causes a process-private interrupt of said trace process;

said first data processing node further including means for reading said trace information, from said data exchange means of said first data processing node in response to said process-private interrupt.

14. A system as claimed in claim 13, in which the means for sending a trace command further comprises:

means for writing a trace command from a trace process into said local data exchange means;

means for initiating said process private interrupt on said local data processing node in response to said trace command;

means for transmitting said trace command across said network; and means for replicating said process-private interrupt on said remote data processing node in response to said trace command.

15. A system as claimed in claim 13, further comprising:
means for re-enabling said process private interrupt.

16. A system as claimed in claim 13, further comprising:
means for re-starting said target process from the beginning of its execution.

17. A system as claimed in claim 13, in which said remote data exchange means and said local data exchange means are mailboxes.

18. A system as claimed in claim 13, in which each of said remote data exchange means and local data exchange means comprise separate mailboxes for said reading and writing trace information operations, respectively.

19. A system as claimed in claim 13, further comprising:
means for encrypting said trace information on said remote data processing node.

20. A system as claimed in claim 19, further comprising:
means for decrypting said trace information on said local data processing node.

21. A system as claimed in claim 13, further comprising:
means for annotating said trace information.

22. A system as claimed in claim 13, in which said network is the Internet.

23. A system as claimed in claim 13, in which said trace information is viewed with a monitor of said data processing nodes.

* * * * *